US011787949B2

United States Patent
Tsunematsu et al.

(10) Patent No.: US 11,787,949 B2
(45) Date of Patent: Oct. 17, 2023

(54) INFRARED ABSORBING FINE PARTICLE DISPERSED POWDER, DISPERSION LIQUID CONTAINING INFRARED ABSORBING FINE PARTICLE DISPERSED POWDER, INK CONTAINING INFRARED ABSORBING FINE PARTICLE DISPERSED POWDER, AND ANTI-COUNTERFEIT INK, AND ANTI-COUNTERFEIT PRINTED MATTER

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 793 days.

(21) Appl. No.: 16/633,987

(22) PCT Filed: Jul. 23, 2018

(86) PCT No.: PCT/JP2018/027456
§ 371 (c)(1),
(2) Date: Apr. 7, 2020

(87) PCT Pub. No.: WO2019/021992
PCT Pub. Date: Jan. 31, 2019

(65) Prior Publication Data
US 2020/0270464 A1 Aug. 27, 2020

(30) Foreign Application Priority Data
Jul. 24, 2017 (JP) .................................. 2017-142902

(51) Int. Cl.
| | |
|---|---|
| *C09C 3/10* | (2006.01) |
| *B41M 3/14* | (2006.01) |
| *C01G 41/02* | (2006.01) |
| *C09D 11/037* | (2014.01) |
| *C09D 11/101* | (2014.01) |
| *C09D 11/50* | (2014.01) |
| *C09D 17/00* | (2006.01) |
| *B42D 25/382* | (2014.01) |

(52) U.S. Cl.
CPC ............... *C09C 3/10* (2013.01); *B41M 3/14* (2013.01); *C01G 41/02* (2013.01); *C09D 11/037* (2013.01); *C09D 11/101* (2013.01); *C09D 11/50* (2013.01); *C09D 17/007* (2013.01); *B42D 25/382* (2014.10); *C01P 2006/20* (2013.01); *C01P 2006/60* (2013.01)

(58) Field of Classification Search
CPC ................ C09C 3/10; Y10T 428/2991; Y10T 428/2998
See application file for complete search history.

(56) References Cited

U.S. PATENT DOCUMENTS

| | | | |
|---|---|---|---|
| 5,503,904 A | 4/1996 | Yoshinaga et al. | |
| 5,830,568 A | 11/1998 | Kondo | |
| 6,060,154 A | 5/2000 | Adachi et al. | |
| 6,153,879 A | 11/2000 | Yoshinaga et al. | |
| 11,208,563 B2 * | 12/2021 | Tsunematsu | C09C 1/00 |
| 2003/0003323 A1 * | 1/2003 | Murakami | C09K 11/025 |
| | | | 428/407 |
| 2006/0178254 A1 * | 8/2006 | Takeda | C01G 41/00 |
| | | | 264/171.25 |
| 2007/0161786 A1 * | 7/2007 | Mitsunaga | C09K 11/7777 |
| | | | 534/15 |
| 2009/0116100 A1 | 5/2009 | Ota et al. | |
| 2010/0261037 A1 | 10/2010 | Fujita | |
| 2011/0297899 A1 | 12/2011 | Tofuku | |
| 2012/0129090 A1 | 5/2012 | Mamak et al. | |
| 2016/0168407 A1 | 6/2016 | Jarvis | |
| 2018/0370813 A1 * | 12/2018 | Tsunematsu | G02B 5/208 |
| 2019/0002708 A1 | 1/2019 | Tsunematsu et al. | |

FOREIGN PATENT DOCUMENTS

| | | |
|---|---|---|
| EP | 2 360 220 A1 | 8/2011 |
| GB | 2 516 773 A | 2/2015 |
| JP | H02-136230 A | 5/1990 |
| JP | H06-210987 A | 8/1994 |
| JP | H08-259279 A | 10/1996 |
| JP | H11-181336 A | 7/1999 |
| JP | 2000-96034 A | 4/2000 |
| JP | 2004-168842 A | 6/2004 |
| JP | 2008-291109 A | 12/2008 |
| JP | 2009-114326 A | 5/2009 |

(Continued)

OTHER PUBLICATIONS

Online Translation JP 2012031270 A (Year: 2012).*
Apr. 6, 2021 Extended Seach Report issued in European Patent Application No. 18838508.2.
Sep. 11, 2018 Search Report issued in International Patent Application No. PCT/JP2018/027456.
Sep. 11, 2018 Written Opinion of the International Searching Authority issued in International Patent Application No. PCT/JP2018/027456.

*Primary Examiner* — Hoa (Holly) Le
(74) *Attorney, Agent, or Firm* — Oliff PLC

(57) ABSTRACT

An infrared absorbing fine particle dispersed powder, dispersion liquid containing infrared absorbing fine particle dispersed powder, ink containing infrared absorbing fine particle dispersed powder, and anti-counterfeit ink and anti-counterfeit printed matter, which are transparent in a visible light region, have excellent infrared absorption properties, and are also excellent in chemical resistance, and an infrared absorbing fine particle dispersed powder containing particles made of solid media and having an average particle size of 1 µm or more and having infrared absorbing fine particles dispersed inside.

12 Claims, No Drawings

(56) References Cited

FOREIGN PATENT DOCUMENTS

| | | | |
|---|---|---|---|
| JP | 2012031270 A | * | 2/2012 |
| JP | 2015-117353 A | | 6/2015 |
| WO | 2005/037932 A1 | | 4/2005 |
| WO | 2010/055570 A1 | | 5/2010 |
| WO | 2016/121801 A1 | | 8/2016 |
| WO | 2017/104854 A1 | | 6/2017 |

* cited by examiner

US 11,787,949 B2

INFRARED ABSORBING FINE PARTICLE DISPERSED POWDER, DISPERSION LIQUID CONTAINING INFRARED ABSORBING FINE PARTICLE DISPERSED POWDER, INK CONTAINING INFRARED ABSORBING FINE PARTICLE DISPERSED POWDER, AND ANTI-COUNTERFEIT INK, AND ANTI-COUNTERFEIT PRINTED MATTER

TECHNICAL FIELD

The present invention relates to infrared absorbing fine particle dispersed powder, dispersion liquid containing infrared absorbing fine particle dispersed powder, ink containing infrared absorbing fine particle dispersed powder, and anti-counterfeit ink, and anti-counterfeit printed matter, which absorb light in an infrared region and have excellent chemical resistance.

DESCRIPTION OF RELATED ART

Various technologies have been proposed so far as an infrared absorption technology that reduces solar transmittance while maintaining transparency with good visible light transmittance. Above all, the infrared absorption technology using inorganic conductive fine particles, has advantages such as better infrared absorption properties, lower cost, radio wave transmission, and higher chemical resistance than other technologies.

For example, Patent Document 1 discloses a technology applying the infrared absorption properties of tin oxide fine powder, and proposes an infrared absorbing synthetic resin molded product formed by molding transparent resin containing tin oxide fine powder in dispersed state, or transparent synthetic resin containing tin oxide fine powder in dispersed state, into a sheet or a film, and laminating it on a transparent synthetic resin substrate.

Patent Document 2 discloses a technology applying infrared absorption properties of metals such as Sn, Ti, Si, Zn, Zr, Fe, Al, Cr, Co, Ce, In, Ni, Ag, Cu, Pt, Mn, Ta, W, V, and Mo, oxide of the metal, nitride of the metal, sulfide of the metal, dopant of Sb or F to the metal or a mixture thereof, and proposes a laminated glass sandwiching an intermediate layer in which these are dispersed in a medium.

Further, an applicant proposes in Patent Document 3 a technology applying infrared absorption properties of titanium nitride fine particles and lanthanum boride fine particles, and discloses a coating solution for a permselective membrane or a permselective membrane in which at least one of these is dispersed in a solvent or a medium.

However, according to the study by the applicant, an infrared absorbing structure such as an infrared absorbing synthetic resin molded product disclosed in Patent Documents 1 to 3 involves a problem such that infrared absorption properties are not sufficient in any one of them when high visible light transmittance is required, and a function as infrared absorbing structure is not sufficient. For example, as an example of specific numerical values of the infrared absorption properties of the infrared absorbing structures disclosed in Patent Documents 1 to 3, when the visible light transmittance calculated based on JIS R 3106 1998 (in the present invention, it may be simply referred to as "visible light transmittance") is 70%, the solar transmittance similarly calculated based on JIS R 3106 1998 (in the present invention, it may be simply referred to as "solar transmittance") exceeds 50%.

Therefore, the applicant proposes in Patent Document 4 a technology applying the composite tungsten oxide as infrared absorbing fine particles, the composite tungsten oxide being represented by a general formula $M_xW_yO_z$ (wherein M element is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, T, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.20 \leq x/y \leq 0.37$, and $2.2 \leq z/y \leq 3.0$.), and discloses a method for producing the infrared absorbing fine particles, and an infrared absorbing dispersion body containing infrared absorbing fine particles wherein the composite tungsten oxide has at least one crystal structures of a hexagonal, tetragonal, or cubic crystal structure, and a particle size of the infrared absorbing material fine particles is 1 nm or more and 800 nm or less.

As disclosed in Patent Document 4, the infrared absorbing fine particle dispersion body containing infrared absorbing fine particles represented by the general formula MxWyOz shows high infrared absorption properties, and when the visible light transmittance was 70%, the solar transmittance was improved to be less than 50%. Particularly, the infrared absorbing fine particle dispersion body using at least one selected from specific elements such as Cs, Rb, and Tl as the M element, and using infrared absorbing fine particles with hexagonal crystal structure, exhibited excellent infrared absorption properties, and the solar transmittance at a visible light transmittance of 70% was improved to less than 37%.

Further, the applicant provides in Patent Document 5 an anti-counterfeit ink composition containing infrared absorbing fine particles represented by the general formula MxWyOz disclosed in Patent Document 4, anti-counterfeit ink in which the anti-counterfeit ink composition is dispersed in a solvent, and an anti-counterfeit printed matter produced using the anti-counterfeit ink. In the printed matter produced using the anti-counterfeit ink, only a specific wavelength is absorbed when the printed surface is irradiated with an infrared laser, and therefore it is possible to judge authenticity by reading reflected or transmitted light, and an anti-counterfeit effect is high for a valuable printed matter such as savings passbooks and identification cards, credit cards, cash cards, checks, air tickets, road tickets, tickets, prepaid cards, gift certificates, and securities.

PRIOR ART DOCUMENT

Patent Document

[Patent Document 1] Japanese Patent Application Laid-Open No. 2-136230
[Patent Document 2] Japanese Patent Application Laid-Open No. 8-259279
[Patent Document 3] Japanese Patent Application Laid-Open No. 11-181336
[Patent Document 4] International Publication No. 2005/037932
[Patent Document 5] Japanese Patent Application Laid-Open No. 2015-117353

SUMMARY OF THE INVENTION

Problem to be Solved by the Invention

However, according to further study by the applicant, the composite tungsten oxide fine particles according to the related art described above have insufficient chemical resistance in some cases. Specifically, there is a problem that when a dispersion body in which the composite tungsten oxide fine particles of the conventional technology are dispersed in a resin or the like is immersed in, for example, a high-temperature alkaline solution, the composite tungsten oxide fine particles are dissolved in the alkaline solution and the infrared absorbing function is lost in some cases.

Under the above-described circumstance, the present invention is provided, and an object of the present invention is to provide infrared absorbing fine particle dispersed powder, dispersion liquid containing infrared absorbing fine particle dispersed powder, ink containing infrared absorbing fine particle dispersed powder, and anti-counterfeit ink and anti-counterfeit printed matter, which are transparent in a visible light region, have excellent infrared absorption properties, and are also excellent in chemical resistance.

Means for Solving the Problem

The present inventors have intensively studied to achieve the above object.

Then, the present inventors obtain a finding such that the chemical resistance of the infrared absorbing fine particles can be improved by dispersing the infrared absorbing fine particles inside the particles made of solid media constituting a predetermined dispersed powder, to form an infrared absorbing fine particle dispersed powder. After further study by the present inventors based on the finding, the present inventors obtain a breakthrough finding such that the chemical resistance is significantly improved when an average particle size is 1 μm or more for the particles made of solid media constituting the dispersed powder. Then, the present inventors also achieved a dispersion liquid containing infrared absorbing fine particle dispersed powder, ink containing infrared absorbing fine particle dispersed powder, anti-counterfeit ink, and an anti-counterfeit printed matter, using the infrared absorbing fine particle dispersed powder containing powder particles in which the infrared absorbing fine particles are dispersed in particles made of solid media having an average particle size of 1 μm or more.

Namely, in order to solve the above-described problem, a first invention is an infrared absorbing fine particle dispersed powder having an average particle size of 1 μm or more and containing particles made of solid media with infrared absorbing fine particles dispersed inside.

A second invention is the infrared absorbing fine particle dispersed powder according to the first invention, wherein the infrared absorbing fine particles are the infrared absorbing fine particles represented by a general formula $M_xW_yO_z$ (wherein M element is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P S, Se, Br, Te, Ti, Nb, V. Mo, Ta, Re, Be, Hf, Os, Bi, I, and Yb, W is tungsten, O is oxygen, satisfying $0.20 \le x/y \le 0.37$, and $2.2 \le z/y \le 3.0$.).

A third invention is the infrared absorbing fine particle dispersed powder according to the second invention, wherein the infrared absorbing fine particles include a hexagonal crystal structure.

A fourth invention is the infrared absorbing fine particle dispersed powder according to the first invention, wherein the infrared absorbing fine particles are infrared absorbing fine particles represented by a general formula WyOz (wherein W is tungsten, O is oxygen, satisfying $2.2 \le z/y \le 2.999$).

A fifth invention is the infrared absorbing fine particle dispersed powder according to the first invention, wherein the infrared absorbing fine particles are infrared absorbing fine particles represented by a general formula XBm (wherein X is at least one metal element selected from Y, La, Ce, Pr, Nd, Sm, Eu, Gd, Tb, Dy, Ho, Er, Tm, Yb, Lu, Sr, Ca, and B is boron, m is a number indicating an amount of boron in the general formula, satisfying $3 \le m \le 20$).

A sixth invention is the infrared absorbing fine particle dispersed powder according to any one of the first to fifth inventions, wherein the solid medium is a resin selected from any one of a resin selected from a resin group of polyethylene resin, polypropylene resin, acrylic resin, polystyrene resin, polyisobutylene resin, epoxy resin, polyimide resin, ionomer resin, fluorine resin, urethane resin, ABS resin, polyvinyl alcohol resin, polyvinyl acetate resin, vinyl chloride resin, and vinylidene chloride resin, or a mixture of two or more resins selected from the above resin group, or a copolymer of two or more resins selected from the above resin group.

A seventh invention is the infrared absorbing fine particle dispersed powder according to any one of the first to sixth inventions, wherein the solid medium is a resin selected from any one of a resin selected from a resin group of polyethylene resin, polypropylene resin, acrylic resin, polystyrene resin, polyisobutylene resin, and fluorine resin, or a mixture of two or more resins selected from the above resin group, or a copolymer of two or more resins selected from the above resin group.

An eighth invention is dispersion liquid containing infrared absorbing fine particle dispersed powder, which contains the infrared absorbing fine particle dispersion powder of any one of the first to seventh inventions, and a solvent.

A ninth invention is ink containing infrared absorbing fine particle dispersed powder, which contains the infrared absorbing fine particle dispersed powder of any one of the first to seventh inventions, and at least one selected from an organic matter or a liquid uncured material of resin curable by energy rays.

A tenth invention is an anti-counterfeit ink, which contains the infrared absorbing fine particle dispersed powder of any one of the first to seventh inventions, and at least one selected from an organic matter or a resin liquid uncured material of resin curable by energy rays.

An eleventh invention is the anti-counterfeit ink according to the tenth invention, further containing a solvent, wherein the solvent is at least one selected from water, organic solvents, vegetable oils, vegetable oil-derived compounds, and petroleum solvents.

A twelve invention is an anti-counterfeit printed matter, containing infrared fine particle dispersed powder of any one of the first to seventh inventions.

A thirteenth invention is a method for producing infrared absorbing fine particle dispersed powder, including:

mixing infrared absorbing fine particles, a surfactant and/or a coupling agent having at least one functional group selected from an amine-containing group, a hydroxyl group, a carboxyl group, or an epoxy group, and a solvent dissolving at least one resin selected from polyethylene resin, polypropylene resin, acrylic resin, polystyrene resin, polyisobutylene resin, epoxy resin, polyimide resin, ionomer resin, fluorine resin, urethane resin, ABS resin, polyvinyl alcohol resin, polyvinyl acetate resin, vinyl chloride resin, and vinylidene chloride resin, to obtain an infrared absorbing fine particle dispersion liquid having a dispersed particle size of the infrared absorbing fine particles of 1 nm or more and 800 nm or less, and thereafter removing the solvent from the infrared absorbing fine particle dispersion liquid to obtain an infrared absorbing fine particle dispersed powder.

Advantage of the Invention

According to the present invention, it is possible to obtain infrared absorbing fine particle dispersed powder exhibiting excellent chemical resistance, and further to obtain a dispersion liquid containing infrared absorbing fine particle dispersed powder, ink containing infrared absorbing fine particle dispersed powder, anti-counterfeit ink, and anti-counterfeit printed matter, using the infrared absorbing fine particle dispersed powder exhibiting excellent chemical resistance, transparent in a visible light region, and having excellent infrared absorption properties.

DETAILED DESCRIPTION OF THE INVENTION

The infrared absorbing fine particle dispersed powder according to the present invention is composed of powder particles in which infrared absorbing fine particles and an additive according to the present invention described below are dispersed in particles made of solid media such as resins, and an average particle size of the powder particles is 1 μm or more. Then, the infrared absorbing fine particle dispersed powder exhibits excellent chemical resistance because the infrared absorbing fine particles are dispersed in the particles made of solid media such as resin.

In addition, dispersion liquid containing infrared absorbing fine particle dispersed powder in which the infrared absorbing fine particle dispersed powder is dispersed in a predetermined solvent or the like (may be referred to as "dispersed powder-containing dispersion liquid" in the present invention), ink containing infrared absorbing fine particle dispersed powder (may be described as "infrared absorbing ink" in the present invention), anti-counterfeit ink, and an anti-counterfeit printed matter using the anti-counterfeit ink also exhibit the same chemical resistance, exhibit absorption in the infrared region, and exhibit optical properties of little absorption of light in the visible light region.

On the other hand, the infrared absorbing fine particle dispersed powder according to the present invention can be obtained by removing a predetermined solvent from the infrared absorbing fine particle dispersion liquid which is obtained by pulverizing and dispersing a mixture of the infrared absorbing fine particles of the present invention described below, a predetermined solvent, a liquid resin, and the like, and an appropriate amount of a dispersant, a coupling agent, a surfactant, and the like, using a medium stirring mill.

Embodiments of the present invention will be described hereafter in an order of [1] Infrared absorbing fine particle dispersed powder and method for producing the same, [2] Dispersion liquid containing infrared absorbing fine particle dispersed powder, and ink containing infrared absorbing fine particle dispersed powder (infrared absorbing ink), [3] Anti-counterfeit ink and anti-counterfeit printed matter.

[1] Infrared Absorbing Fine Particle Dispersed Powder and Method for Producing the Same As described above, the infrared absorbing fine particle dispersed powder of the present invention contains particles made of solid media having an average particle size of 1 μm or more, with infrared absorbing fine particles dispersed inside.

The infrared absorbing fine particle dispersed powder of the present invention and the method for producing the same will be described hereafter in an order of (1) Properties of the infrared absorbing fine particle dispersed powder, (2) Constituent components of the infrared absorbing fine particle dispersed powder, (3) Method for producing infrared absorbing fine particle dispersed powder, (4) Use method and application of infrared absorbing fine particle dispersed powder.

(1) Properties of the Infrared Absorbing Fine Particle Dispersed Powder

The infrared absorbing fine particle dispersed powder according to the present invention has an average particle size of 1 μm or more, and in the infrared absorbing fine particle dispersed powder of the present invention, the infrared absorbing fine particles are dispersed in particles made of solid media such as resin with high chemical resistance. Therefore, the infrared absorbing fine particle dispersed powder of the present invention exhibits excellent chemical resistance, has absorption in the infrared region, and has little absorption of light in the visible light region. Then, by dispersing the infrared absorbing fine particle dispersed powder in a predetermined solvent, and the like, dispersion liquid containing dispersed powder described below, infrared absorbing ink, and anti-counterfeit ink, and the like can be obtained.

Here, when the average particle size of the infrared absorbing fine particle dispersed powder of the present invention is 1 μm or more, the infrared absorbing fine particles of the present invention having a dispersed particle size of 800 nm or less are covered with a resin having a sufficient thickness. Therefore, even if the infrared absorbing fine particle dispersed powder of the present invention is immersed in, for example, a high temperature alkaline solution or acid, the infrared absorbing fine particles of the present invention are not dissolved therein, and predetermined optical properties can be ensured.

From the above-described viewpoint, it is preferable that the average particle size of the infrared absorbing fine particle dispersed powder of the present invention is 1 μm or more and 1000 μm or less. On the other hand, when the infrared absorbing fine particle dispersed powder of the present invention is used for an infrared absorbing ink or an anti-counterfeit ink described below, the average particle size of the infrared absorbing fine particle dispersed powder is more preferably 1 μm or more and 100 μm or less, and further preferably 1 μm or more and 10 μm or less, from a viewpoint of ensuring transparency in the visible light region.

Note that the average particle size of the infrared absorbing fine particle dispersed powder of the present invention can be measured as a median value of a volume cumulative particle size, by Microtrack (registered trademark) etc., manufacture by Microtrack Bell Inc., based on a laser diffraction and scattering method. In the measurement of the average particle size of the infrared absorbing fine particle dispersed powder, the average particle size can be measured by dispersing the infrared absorbing fine particle dispersed powder in a solvent that does not dissolve the infrared absorbing fine particle dispersed powder, such as water. At the time of measurement, a small amount of a dispersant such as sodium hexametaphosphate can be added.

(2) Constituent Components of the Infrared Absorbing Fine Particle Dispersed Powder The infrared absorbing fine particle dispersed powder of the present invention can be obtained by removing a predetermined solvent from the infrared absorbing fine particle dispersion liquid in which the infrared absorbing fine particles of the present invention, a resin, a dispersant, and if desired, other additives are dispersed in a predetermined solvent.

The constituent components of the infrared absorbing fine particle dispersed powder of the present invention will be described hereafter in an order of (i) Infrared absorbing fine particles of the present invention, and (ii) Solid medium.

(i) Infrared Absorbing Fine Particles of the Present Invention

The infrared absorbing fine particles of the present invention will be described in an order of (A) Composite tungsten oxide-based infrared absorbing fine particles represented by a general formula $M_xW_yO_z$, (B) Tungsten oxide-based infrared absorbing fine particles represented by a general formula $W_yO_z$, (C) Structure of the composite tungsten oxide-based and tungsten oxide-based infrared absorbing fine particles according to the present invention, (D) A method for synthesizing the composite tungsten oxide-based and tungsten oxide-based infrared absorbing fine particles according to the present invention, (E) Boride-based infrared absorbing fine particles represented by a general formula $XB_m$, (F) A method for synthesizing the boride-based infrared absorbing fine particles according to the present invention, (G) Mixed use of the composite tungsten oxide-based infrared absorbing fine particles, tungsten oxide-based infrared absorbing fine particles, and boride-based infrared absorbing fine particles.

(A) Composite Tungsten Oxide-Based Infrared Absorbing Fine Particles Represented by a General Formula $M_xW_yO_z$ The infrared absorbing fine particles represented by a general formula $M_xW_yO_z$ (wherein M is at least one element selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \le x/y \le 1$, $2.0 < z/y \le 3.0$), and the infrared absorbing fine particles represented by a general formula $W_yO_z$ ($2.2 \le z/y \le 2.999$), are preferable as the infrared absorbing fine particles according to the present invention.

The infrared absorbing fine particles represented by the general formula $M_xW_yO_z$ will be further described.

In the infrared absorbing fine particles represented by the general formula $M_xW_yO_z$, the type of the M element, the values of x, y, and z, and the crystal structure thereof are closely related to a free electron density of the infrared absorbing fine particles, and has a great influence on the infrared absorption properties.

Generally, there are no effective free electrons in tungsten trioxide ($WO_3$), and therefore the infrared absorption properties are low.

Here, the present inventors achieve a configuration such that the M element (wherein the M element is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V Mo, Ta, Re, Be, Hf, Os, Bi, I, and Yb) is added to the tungsten oxide, to obtain the composite tungsten oxide. With this configuration, free electrons are generated in the composite tungsten oxide, and absorption properties derived from the free electrons are expressed in an infrared region.

Therefore, it is found that the composite tungsten oxide is effective as an infrared absorbing material with around 1000 nm wavelength, and maintains a chemically stable state and is effective as an infrared absorbing material having excellent chemical resistance. It is also found that Cs, Rb, K, Tl, Ba, Cu, Al, Mn, and in are preferable as the M element, and above all, when the M element is Cs or Rb, the composite tungsten oxide easily has a hexagonal structure, transmits visible light, absorbs and shields infrared light, and therefore Cs and Rb as the M element is particularly preferable for the reason described below.

Here, the finding of the present inventors regarding the value of x indicating an addition amount of the M element will be described.

When the value of x/y is 0.001 or more, a sufficient amount of free electrons is generated and a desired near-infrared absorption property can be obtained. Then, as the addition amount of the M element is increased, a feed amount of the free electrons is increased and the near-infrared absorption property is also increased, but when the value of x/y is about 1, the effect is saturated. Further, when the value of x/y is 1 or less, generation of an impurity phase in the composite tungsten fine particles can be avoided, which is preferable.

Next, the finding of the present inventors regarding the value of z indicating a control of an oxygen amount will be described.

In the infrared absorbing fine particles represented by the general formula $M_xW_yO_z$, the value of z/y is preferably $2.0 < z/y \le 3.0$, more preferably, $2.2 \le z/y \le 3.0$, further preferably, $2.6 \le z/y \le 3.0$, and most preferably, $2.7 \le z/y \le 3.0$. This is because when the value of z/y is 2.0 or more, it is possible to avoid an appearance of a crystal phase of $WO_2$, which is a compound other than a target compound, in the composite tungsten oxide, and possible to obtain a chemical stability as a material, and possible to apply as an effective infrared shielding material. On the other hand, when the value of z/y is 3.0 or less, a required amount of the free electrons is generated in the tungsten oxide, and the infrared absorbing fine particles can be obtained as an efficient infrared shielding material.

(B) Tungsten Oxide-Based Infrared Absorbing Fine Particles Represented by a General Formula $W_yO_z$ The infrared absorbing fine particles represented by the general formula $W_yO_z$ will be described.

A composition range of tungsten and oxygen in the general formula $W_yO_z$ is preferably such that the composition ratio of oxygen to tungsten is 3 or less, and when the tungsten oxide is described as $W_yO_z$, the range of z/y satisfies $2.2 \le z/y \le 2.999$. This is because when the value of z/y is 2.2 or more, it is possible to avoid an appearance of a crystal phase of $WO_2$, which is a compound other than a target compound, in the composite tungsten oxide, and possible to obtain a chemical stability as a material, and possible to apply as an effective infrared shielding material.

On the other hand, when the value of z/y is 2.999 or less, a required amount of the free electrons is generated in the tungsten oxide, and the infrared absorbing fine particles can be obtained as an efficient infrared shielding material.

In the tungsten oxide fine particles obtained by converting the tungsten oxide into fine particles, a so-called "Magneli phase" is chemically stable, which has a composition ratio represented by $2.45 \le z/y \le 2.999$ when described as the general formula $W_yO_z$, and excellent absorption properties can be obtained in the infrared region, and therefore the tungsten oxide fine particles are preferable as the infrared absorbing material.

(C) Structure of the Composite Tungsten Oxide-Based and Tungsten Oxide-Based Infrared Absorbing Fine Particles According to the Present Invention The infrared absorbing fine particles according to the present invention have a tetragonal or cubic tungsten bronze structure other than the hexagonal structure, and any of these structures is effective as an infrared shielding material. However, depending on the crystal structure taken by the infrared absorbing fine particles, an absorption position in the near-infrared region tends to change as follows: it tends to move to a longer wavelength side when the crystal structure is tetragonal rather than cubic, and it tends to move to the longer wavelength side when the crystal structure is hexagonal rather than tetragonal. Further, absorption in the visible light region is the smallest in the hexagonal crystal structure, followed by tetragonal crystal structure, and it is largest in the cubic crystal structure among them, accompanying a fluctuation of the absorption position.

In view of the above finding, it is preferable to use hexagonal tungsten bronze for applications that transmit more visible light and shield more infrared light. When the infrared absorbing fine particles have a hexagonal crystal structure, the transmission of the fine particles in the visible light region is improved and the absorption in the near infrared region is improved.

Namely, the hexagonal tungsten bronze exhibits excellent optical properties, in the infrared absorbing fine particles. Further, in the case where the infrared absorbing fine particles have a monoclinic crystal structure similarly to $WO_{2.72}$ called a Magneli phase or an orthorhombic crystal structure, the infrared absorbing fine particles have excellent infrared absorption, and are effective as a near-infrared ray shielding material.

In view of the above finding, when the infrared absorbing fine particles with a hexagonal crystal structure have a uniform crystal structure, the addition amount of the added M element is preferably 0.2 or more and 0.5 or less, more preferably $0.29 \leq x/y \leq 0.39$ in terms of x/y. Theoretically, when the value of x/y is 0.33 in the case of z/y=3, it is considered that the added M element is arranged in all the hexagonal voids.

The dispersed particle size of the infrared absorbing fine particles is preferably 800 nm or less and 1 nm or more, and more preferably 200 nm or less and 1 nm or more. The fact that the dispersed particle size of the infrared absorbing fine particles is preferably 200 nm or less is also the same for the infrared absorbing fine particles in the infrared absorbing fine particle dispersion liquid. This is because when the dispersed particle size is 200 nm or less, excellent visible light transparency can be ensured, the change in color tone due to the use of infrared absorbing fine particles is reduced, and toning of the final anti-counterfeit printed matter is easy. On the other hand, the dispersed particle size is preferably 1 nm or more, more preferably 10 nm or more, from a viewpoint of the infrared absorption properties of the infrared absorbing fine particles.

(D) A Method for Synthesizing the Composite Tungsten Oxide-Based and Tungsten Oxide-Based Infrared Absorbing Fine Particles According to the Present Invention The method for synthesizing the composite tungsten oxide-based and tungsten oxide-based fine particles according to the present invention will be described.

The composite tungsten oxide-based and tungsten oxide-based fine particles according to the present invention can be produced by a solid phase reaction method. Explanation will be given in an order of (a) Raw materials used in the solid phase reaction method, and (b) Firing and its conditions in the solid phase reaction method.

(a) Raw Materials Used in the Solid Phase Reaction Method

When synthesizing the infrared absorbing fine particles represented by the general formula MxWyOz according to the present invention by the solid phase reaction method, a tungsten compound and an M element compound are used as raw materials.

The tungsten compound is preferably at least one selected from tungstic acid ($H_2WO_4$), ammonium tungstate, tungsten hexachloride, and tungsten hydrate obtained by adding water to tungsten hexachloride dissolved in alcohol, hydrolyzing, and then evaporating a solvent.

Further, the M element compound used for producing the raw material of the infrared absorbing fine particles represented by the general formula MxWyOz which is a more preferable embodiment (wherein M is at least one element selected from Cs, Rb, K, Tl, Ba, satisfying $0.001 \leq x/y \leq 1$, $2.0 \leq z/y \leq 3.0$), is preferably at least one selected from M element oxides, hydroxides, nitrates, sulfates, chlorides, and carbonates.

Further, the composite tungsten oxide-based and tungsten oxide-based fine particles according to the present invention may contain a compound containing at least one impurity element selected from Si, Al, and Zr (may be referred to as "impurity element compound in the present invention"), as a raw material. The impurity element compound does not react with the composite tungsten compound in a subsequent firing step, and works to suppress crystal growth of the composite tungsten oxide and prevent crystal coarsening. The compound containing an impurity element is preferably at least one selected from oxides, hydroxides, nitrates, sulfates, chlorides, and carbonates, and colloidal silica or colloidal alumina having a particle size of 500 nm or less is particularly preferable.

The tungsten compound and an aqueous solution containing the M element compound are wet mixed, so that the ratio of M element to W element is the ratio of M element to W element of MxWyOz (wherein M is the M element, W is tungsten, O is oxygen, satisfying $0.001 \leq x/y \leq 1.0$, $2.0 < z/y \leq 3.0$). When containing the impurity element compound as the raw material, wet mixing is performed so that the impurity element compound is 0.5 mass % or less. Then, by drying the obtained mixture, it is possible to obtain a mixed powder of the M element compound and the tungsten compound or a mixed powder of the M element compound and the tungsten compound containing the impurity element compound.

Further, in the case of the infrared absorbing fine particles represented by the general formula WyOz, a starting tungsten compound is preferably at least one selected from tungsten trioxide powder, tungsten oxide powder or tungsten oxide hydrate, or, 6 tungsten chloride powder, or ammonium tungstate powder, or a tungsten oxide hydrate powder obtained by dissolving hexatungsten chloride in alcohol and then drying, or 6 tungsten chloride hydrate powder obtained by dissolving tungsten chloride in alcohol, adding water to a precipitate and drying the precipitate, or a tungsten compound powder obtained by drying an aqueous solution of ammonium tungstate, or metal tungsten powder.

(b) Firing and its Conditions in the Solid Phase Reaction Method

Mixed powder of the M element compound and the tungsten compound produced by the wet mixing, or mixed powder of the MI element compound containing the impurity element compound and the tungsten compound, are fired in one step under an atmosphere of an inert gas alone or a mixed gas of the inert gas and a reducing gas. In this event, a firing temperature is preferably close to a temperature at which the infrared absorbing fine particles start to crystallize. Specifically, the firing temperature is preferably 1000° C. or loser, more preferably 800° C. or lower, and further more preferably 800° C. or lower and 500° C. or higher. By controlling the firing temperature, the infrared absorbing fine particles having good crystallinity can be obtained.

However, in the synthesis of the composite tungsten oxide, tungsten trioxide may be used instead of the tungsten compound.

Further, when producing tungsten oxide fine particles represented by the general formula WyOz, tungsten oxide hydrate powder, tungsten trioxide, or tungsten compound powder obtained by drying aqueous solution of ammonium tungstate is preferably used from a viewpoint of ease of production steps, and when producing the composite tungsten oxide fine particles, the aqueous solution of ammonium tungstate or a solution of tungsten hexachloride is further preferably used when a starting material is a solution, from a viewpoint that each element can be easily mixed uniformly. Infrared shielding material fine particles containing the above-described tungsten oxide fine particles can be obtained, using the above raw materials, and applying heat treatment thereto in an inert gas atmosphere or a reducing gas atmosphere.

(E) Boride-Based Infrared Absorbing Fine Particles Represented by a General Formula XBm The boride-based infrared absorbing fine particles according to the present invention are boride particles represented by a general formula XBm (wherein X is at least one metal element selected from Y, La, Ce, Pr, Nd, Sm, Eu, Gd, Tb, Dy, Ho, Er, Tm, Yb, Lu, Sr, Ca, B is boron, m is a number indicating an amount of boron in the general formula).

Boride particles according to the present invention can be boride particles represented by the general formula XBm as described above.

In the boride particles according to the present invention represented by the general formula XBm, the value of m indicating an element ratio (molar ratio) (B/X) of boron (B) to a metal element (X) is not particularly limited, but is preferably $3 \leq m \leq 20$.

Examples of the boride constituting boride particles represented by the general formula XBm include $XB_4$, $XB_6$, $XB_{12}$, and the like. However, boride particles according to the present invention preferably mainly contain $XB_4$ or $XB_6$, but may partially contain $XB_{12}$, from a viewpoint of selectively and efficiently lowering the transmittance of light in the near infrared region around 1000 nm wavelength.

Therefore, the value of in, which is the element ratio (B/X) of boron (B) to the metal element (X) in the general formula XBm, is further preferably $4.0 \leq m \leq 6.2$.

When the value of (B/X) is 4.0 or more, generation of XB, XB2, and the like can be suppressed, and although the reason is unknown, solar shading properties can be improved. Further, when the value of the above (B/X) is 6.2 or less, particularly, a content ratio of hexaboride having excellent solar shielding properties can be increased, and the solar shielding properties are improved, which is preferable.

Among the borides described above, $XB_6$ has a particularly high near-infrared absorption ability, and thus boride particles according to the present invention preferably mainly contain $XB_6$.

Therefore, the value of m, which is the element ratio (B/X) of boron (B) to the metal element (X), is further preferably $5.8 \leq m \leq 6.2$ in boride particles according to the present invention represented by the general formula XBm.

When boride particles are produced, the obtained powder containing boride particles does not consist only of boride particles having a single composition, but may be particles containing boride having a plurality of compositions. Specifically, for example, particles of a mixture of borides such as $XB_4$, $XB_6$, and $XB_{12}$ can be used.

Accordingly, for example, when an X-ray diffraction measurement is performed for the hexaboride particles, which are typical boride particles, it is considered that the hexaboride particles actually contain a slight amount of other phase even if it is a single phase according to an analysis by the X-ray diffraction.

Therefore, the value of m in the general formula XBm of boride particles according to the present invention, can be an atomic ratio of boron (B) to one atom of element X, for example, when the obtained powder containing boride particles is chemically analyzed by ICP emission spectroscopy (high frequency inductively coupled plasma emission spectroscopy) or the like.

On the other hand, the metal element (X) of the boride particles according to the present invention is not particularly limited, and for example, can be at least one metal element selected from Y, La, Ce, Pr, Nd, Sm, Eu, Gd, Tb, Dy, Ho, Er, Tm, Yb, Lu, Sr, and Ca.

However, lanthanum hexaboride, which is a hexaboride of lanthanum, has particularly high near-infrared absorptivity. Therefore, boride particles according to the present invention preferably contain lanthanum hexaboride particles.

Here, although the boride particles such as hexaboride particles are in the form of powder that are colored dark blue-purple, etc., visible light transmission occurs in the layer in a state where the particle size is pulverized so as to be sufficiently smaller than a wavelength of the visible light and dispersed in a predetermined layer. At the same time, the layer has an infrared shielding function and becomes an infrared shielding layer.

The reason why the boride particles exhibit the infrared shielding function has not been clarified in detail. However, the reason can be considered as follows: these boride materials have relatively many free electrons, and inter-band transition between 4f-5d and absorption due to electron-electron and electron-phonon interactions exist in the near infrared region.

According to the study by the present inventors, it is confirmed that the infrared shielding layer with these boride particles dispersed finely and uniformly, the transmittance of the layer has a local maximum value in a wavelength region of 400 nm to 700 nm and a local minimum value in a wavelength region of 700 nm to 1800 nm. It can be understood that such a layer effectively transmits visible light and effectively absorbs and reflects other sunlight, considering that the wavelength of visible light is 380 nm or more and 780 nm or less, and that the visibility is formed in a bell-shape with a peak around a wavelength of 550 nm.

The average dispersed particle size of boride particles according to the present invention is preferably 100 nm or less, more preferably 85 nm or less. Here, the average dispersed particle size can be measured by a particle size measuring device based on a dynamic light scattering method.

A lower limit of the average dispersed particle size of the boride particles is not particularly limited, but is preferably, for example, 1 nm or more. This is because when the average dispersed particle size of boride particles is 1 nm or more, industrial production is easy.

(F) A Method for Synthesizing the Boride-Based Infrared Absorbing Fine Particles According to the Present Invention A method for synthesizing the boride-based infrared absorbing fine particles is not particularly limited, provided that it is a method for producing boride particles represented by the general formula $XB_m$ (wherein X is at least one metal element selected from Y, La, Ce, Pr, Nd, Sm, Eu, Gd, Tb, Dy, Ho, Er, Tm, Yb, Lu, Sr, and Ca).

One example of the configuration of the method for producing boride particles according to the present invention includes, for example, a solid-phase reaction method using carbon or boron carbide as a reducing agent.

The method for producing boride particles will be described hereafter, with reference to an example in which lanthanum is used as a metal element.

For example, boride particles using lanthanum as a metal element can be produced by firing a mixture of a boron source, a reducing agent, and a lanthanum source.

Specifically, for example, when producing lanthanum boride particles using boron carbide as a boron source and a reducing agent, and lanthanum oxide as a lanthanum source, first, a raw material mixture of boron carbide and lanthanum oxide is prepared. Next, when the raw material mixture is fired at a temperature of 1500° C. or higher in an inert atmosphere, lanthanum oxide is reduced by carbon in boron carbide, and carbon monoxide and carbon dioxide are generated to remove the carbon. Further, lanthanum boride is obtained from the remaining lanthanum and boron.

Note that carbon derived from boron carbide is not completely removed as carbon monoxide and carbon dioxide, but partly remains in lanthanum boride particles to become carbon impurity. Therefore, by suppressing a proportion of boron carbide in the raw material, a concentration of the carbon impurity in the obtained lanthanum boride particles can be suppressed, which is preferable.

As described above, the obtained powder containing boride particles does not contain only boride particles having a single composition, but are particles of a mixture with $LaB_4$, $LaB_6$, $LaB_{12}$ and the like. Accordingly, when the powder containing the obtained boride particles is measured for X-ray diffraction, it is considered that the hexaboride particles actually contain a slight amount of other phase even if it is a single phase according to the analysis by the X-ray diffraction.

Here, when producing boride particles using lanthanum as a metal element as described above, the value of the element ratio B/La of boron in the raw material boron source and lanthanum in the raw material lanthanum source is not particularly limited, but is preferably 3.0 or more and 20.0 or less.

Particularly, when the element ratio B/La of boron in the raw material boron source and lanthanum in the raw material lanthanum source is 4.0 or more, generation of LaB, $LaB_2$, and the like can be suppressed. This is preferable because the solar shielding properties can be improved, although the reason is not clarified.

On the other hand, when the value of the element ratio B/La of boron in the raw material boron source and lanthanum in the raw material lanthanum source is 6.2 or less, generation of boron oxide particles other than boride particles is suppressed. Since boron oxide particles are hygroscopic, moisture resistance of the powder containing boride particles is improved by reducing an amount of boron oxide particles in the powder containing boride particles, which is preferable because deterioration with time of the solar shielding properties is suppressed.

Therefore, it is preferable that the value of the element ratio B/La of boron in the raw material boron source and lanthanum in the raw material lanthanum source be 6.2 or less to suppress the generation of boron oxide particles. Further, when the value of the element ratio B/La is 6.2 or less, it is possible to increase the proportion of a content of hexaboride which is particularly excellent in solar shielding properties, thus improving the solar shielding properties, which is preferable.

In order to further reduce the impurity carbon concentration, it is effective to reduce the proportion of boron carbide in the raw material as much as possible. Therefore, a powder containing particles of lanthanum boride having an impurity carbon concentration of 0.2 mass % or less can be more reliably obtained, for example by setting the value of B/La to 6.2 or less to generate particles of lanthanum boride, which is preferable.

As described above, when producing the boride particles using lanthanum as the metal element, more preferably, the value of the elemental ratio (molar ratio) B/La of boron in the boron source and lanthanum in the lanthanum source is 4.0 or more and 6.2 or less. By setting the composition of the raw material to the above range, it is possible to obtain a powder containing lanthanum boride particles exhibiting high solar shielding properties while suppressing the impurity concentration in the obtained powder containing lanthanum boride particles at a low level, which is preferable.

Further, the obtained lanthanum boride particles preferably mainly contain $LaB_6$. This is because $LaB_6$ has a particularly high near-infrared absorption ability.

Therefore, the value of the element ratio B/La of boron in the raw material boron source and lanthanum in the raw material lanthanum source is further preferably 5.8 or more and 6.2 or less.

Therefore, here, explanation is given for the case of producing lanthanum boride particles as an example, using boron carbide as a boron source and a reducing agent, and using lanthanum oxide as a lanthanum source. However, the present invention is not limited thereto. For example, it is also possible to use boron or boron oxide as a boron source, and use carbon as a reducing agent and lanthanum oxide as a lanthanum source respectively. In this case, it is preferable to perform a preliminary test or the like and select a mixing ratio of each component so that impurities such as excess carbon and oxygen do not remain in a product.

As described above, explanation is given for the method for producing boride particles, for example with reference to the case of using lanthanum as the metal element.

A compound containing the metal element X can be used instead of lanthanum oxide, depending on the metal element X to be contained in the boride particles to be produced. Examples of the compound containing the metal element X include at least one selected from a hydroxide of the metal element X, a hydrate of the metal element X, and an oxide of the metal element X. The method for producing the compound containing the metal element X is not particularly limited. For example, a solution containing a compound containing the metal element X and an alkaline solution are reacted with stirring to form a precipitate, and the compound containing the metal element X can be obtained from this precipitate.

As described above, even when the compound containing the metal element X is used instead of lanthanum oxide, it is preferable to perform a preliminary test or the like and select a mixing ratio of each component so that impurities such as excess carbon and oxygen do not remain in the product. For example, the element ratio of boron in the boron source and the metal element X in the metal element X source may be the same as the above-described element ratio of boron in the boron source and lanthanum in the lanthanum source.

The obtained boride particles can be converted into boride particles having a desired average dispersed particle size by performing, for example, wet pulverization and the like.

(G) Mixed Use of the Composite Tungsten Oxide-Based Infrared Absorbing Fine Particles, Tungsten Oxide-Based Infrared Absorbing Fine Particles, and Boride-Based Infrared Absorbing Fine Particles The above-described composite tungsten oxide-based infrared absorbing fine particles represented by the general formula $M_xW_yO_z$, tungsten oxide-based infrared absorbing fine particles represented by the general formula $W_yO_z$, and boride-based infrared absorbing fine particles represented by the general formula $XB_m$, may be used alone respectively. However, it is also preferable to use a mixture of two or more kinds of infrared absorbing fine particles selected from these infrared absorbing fine particles.

This is because a desired infrared absorption profile shape may be obtained in some cases by mixing and using these infrared absorbing fine particles appropriately, because the shapes of the infrared absorption profiles of these infrared absorbing fine particles are different from each other.

A known method may be used as a mixing method.

(ii) Solid Medium

Various resins are preferably used as a solid medium constituting the infrared absorbing fine particle dispersed powder according to the present invention. These resins are dissolved in a predetermined solvent described below, and a mixture is thereby formed with the infrared absorbing fine particles, the dispersant, and the like according to the present invention obtained by the above-described synthesis method, and an infrared absorbing fine particle dispersion liquid is obtained as described below.

Specific examples of preferable resins as solid media include: polyethylene resin, polypropylene resin, acrylic resin, polystyrene resin, polyisobutylene resin, epoxy resin, polyimide resin, ionomer resin, fluorine resin, urethane resin, ABS resin, polyvinyl alcohol resin, polyvinyl acetate resin, vinyl chloride resin, vinylidene chloride resin, etc.

Especially, polyethylene resin, polypropylene resin, acrylic resin, polystyrene resin, polyisobutylene resin, and fluororesin are particularly preferable because of their high chemical resistance.

(3) Method for Producing Infrared Absorbing Fine Particle Dispersed Powder

As described above, when producing the infrared absorbing fine particle dispersed powder according to the present invention, first, the infrared absorbing fine particle dispersion liquid is produced, and the solvent is removed therefrom.

The method for producing the infrared absorbing fine particle dispersed powder according to the present invention will be described hereafter, in an order of (A) Infrared absorbing fine particle dispersion liquid, (B) Method for producing infrared absorbing fine particle dispersion liquid, (C) Removal of solvent, (D) Method for producing different infrared absorbing fine particle dispersed powder.

(A) Infrared Absorbing Fine Particle Dispersion Liquid

A component of the infrared absorbing fine particle dispersion liquid includes: the infrared absorbing fine particles according to the present invention obtained by the above-described synthesis method, and a solid medium (resin) soluble in a predetermined solvent, and a predetermined solvent, and also includes: a dispersant, high-molecular monomer constituting a predetermined solid medium, or a mixture of them, and further includes a material obtained by pulverizing appropriate amounts of these components using a medium stirring mill to be dispersed in a solvent. Explanation will be given hereafter in an order of (i) dispersant, (ii) other additives, (iii) solvent, and (iv) properties of the infrared absorbing fine particle dispersion liquid.

(i) Dispersant

In order to further improve the dispersion stability of the infrared absorbing fine particles according to the present invention, and to avoid coarsening of the dispersed particle size due to re-aggregation in the above-described infrared absorbing fine particle dispersion liquid, various surfactants, coupling agents and the like are added as dispersants.

The dispersant such as the surfactant and the coupling agent can be selected according to an application, and it is preferable that the dispersant has an amine-containing group, a hydroxyl group, a carboxyl group, or an epoxy group as functional groups. These functional groups have an effect of adsorbing on the surface of the infrared absorbing fine particles to prevent aggregation, and uniformly dispersing the infrared absorbing fine particles according to the present invention even in the infrared shielding layer. A polymer dispersant having any of these functional groups in the molecule is more desirable. Further, the polymer dispersant can also exert an effect of a solid medium such as a resin in the infrared absorbing fine particle dispersed powder.

A commercially available dispersant includes: Solsperse (registered trademark) 9000, 12000, 17000, 20,000, 21000, 24000, 26000, 27000, 28000, 32000, 35100, 54000, 250 (manufactured by Japan Lubrizol Corporation), EFKA (registered trademark) 4008, 4009, 4010, 4015, 4046, 4047, 4060, 4080, 7462, 4020, 4050, 4055, 4400, 4401, 4402, 4403, 4300, 4320, 4330, 4340, 6220, 6225, 6700, 6780, 6782, 8503 (manufactured by Efka Addives), Addispar (registered trademark) PA111, PB821, PB822, PN411, Famex L-12 (manufactured by Ajinomoto Fine Techno Co., Ltd.), DisperB YK (registered trademark) 101, 102, 106, 108, 111, 116, 130, 140, 142, 145, 161, 162, 163, 164, 166, 167, 168, 170, 171, 174, 180, 182, 192, 193, 2000, 2001, 2020, 2025, 2050, 2070, 2155, 2164, 220S, 300, 306, 320, 322, 325, 330, 340, 350, 377, 378, 380N, 410, 425, 430 (manufactured by Big Chemie Japan Co., Ltd.), Dispalon (registered trademark) 1751N, 1831, 1850, 1860, 1934, DA-400N, DA-703-50, DA-725, DA-705, DA-7301, DN-900, NS-5210, NVI-8514L (manufactured by Kusumoto Kasei Co., Ltd.), and Alphon (registered trademark) UC-3000, UF-5022, UG-4010, UG-4035, UG-4070 (manufactured by Toagosei Co., Ltd.).

(ii) Other Additives

In order to adjust the color tone of the infrared absorbing fine particle dispersed powder according to the present invention, a known inorganic pigment such as carbon black or red iron oxide or a known organic pigment can be added. Further, a known ultraviolet absorber, a known infrared shielding material of an organic substance, or a phosphorus-based coloring inhibitor may be added. Further, a catalyst or the like for polymerizing a polymer monomer may be contained.

(iii) Solvent

The solvent used for producing the infrared absorbing fine particle dispersion liquid is not particularly limited, and may be appropriately selected according to the solubility in the added solid medium (resin) and the solubility of the polymer constituting the solid medium in the monomer. For example, water or an organic solvent may be selected.

Although the details will be described later, an amount of a residual solvent in the infrared absorbing fine particle dispersed powder according to the present invention is preferably equal to or less than a predetermined amount.

Here, as the organic solvent, various solvents such as alcohols, ketones, hydrocarbons, glycols, and water can be selected.

Specifically, alcoholic solvents such as methanol, ethanol, i-propanol, isopropanol, butanol, pentanol, benzyl alcohol, diacetone alcohol; ketone solvents such as acetone, methyl ethyl ketone, methyl propyl ketone, methyl isobutyl ketone, cyclohexanone, isophorone; ester solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, dimethylformamide, dimethylacetamide, N-methyl-2-pyrrolidone; aromatic hydrocarbons such as toluene and xylene; ethylene chloride, chlorobenzene, etc., can be used.

Among these organic solvents, it is preferable to use an organic solvent having a boiling point of 120° C. or lower, and particularly, dimethyl ketone, methyl ethyl ketone, methyl isobutyl ketone, toluene, propylene glycol monomethyl ether acetate, n-butyl acetate and the like are preferable, when producing the infrared absorbing fine particle dispersed powder.

Even when using an organic solvent having a boiling point of more than 120° C., it can be used for producing the infrared absorbing fine particle dispersed powder by replacing the organic solvent of the infrared absorbing fine particle dispersion liquid with an organic solvent having a boiling point of 120° C. or lower.

The solvents described above can be used alone or in combination of two or more. Further, if necessary, the pH may be adjusted by adding an acid or an alkali to these liquid solvents.

(iv) Properties of the Infrared Absorbing Fine Particle Dispersion Liquid

A liquid plasticizer for plastics, a coupling agent, a surfactant, and the like can be further added to the infrared absorbing fine particle dispersion liquid.

Here, in the infrared absorbing fine particle dispersion liquid, the infrared absorbing fine particles are in a good dispersion state, and the dispersed particle size is 1 to 800 nm.

When the dispersed particle size of the infrared absorbing fine particles according to the present invention in the infrared absorbing fine particle dispersion liquid is 1 to 800 nm, light in the visible light region having a wavelength of 380 nm to 780 nm is not scattered by geometric scattering or Mie scattering in the dispersion liquid containing the dispersed powder, the infrared absorbing ink, the anti-counterfeit ink, and the like, which will be described later, and therefore haze can be reduced and visible light transmittance can be increased, which is preferable. Further, the scattered light decreases in proportion to the sixth power of the particle size as the dispersed particle size decreases in the Rayleigh scattering region, and therefore scattering is reduced and transparency is improved. Accordingly, when the dispersed particle size is 200 nm or less, an amount of the scattered light is very small, haze can be suppressed, and therefore transparency can be further increased, which is preferable.

Note that the dispersed particle size of infrared absorbing fine particles means a particle size of simple particles of the infrared absorbing fine particles dispersed in the solvent, or aggregated particles in which the infrared absorbing fine particles are aggregated, and can be measured using ELS-8000 manufactured by Otsuka Electronics Co., Ltd. or Nanotrack (registered trademark) manufactured by Microtrack Bell Co., Ltd. based on a dynamic light scattering method.

Then, the content of the infrared absorbing fine particles contained in the infrared absorbing fine particle dispersion liquid is preferably 0.01 mass % or more and 80 mass % or less.

(B) Method for Producing Infrared Absorbing Fine Particle Dispersion Liquid

The method for dispersing the infrared absorbing fine particles in the infrared absorbing fine particle dispersion liquid according to the present invention is not particularly limited, as long as the fine particles can be uniformly dispersed without aggregation in the dispersion liquid. The dispersion method includes, for example, pulverization/dispersion treatment method using devices such as a bead mill, a ball mill, a sand mill, a paint shaker, an ultrasonic homogenizer, etc. Especially, pulverization and dispersion by a medium stirring mill such as a bead mill, a ball mill, a sand mill, and a paint shaker using media such as beads, balls, and Ottawa sand are preferable because the time required for a desired dispersed particle size is short.

By pulverization and dispersion treatment using the medium stirring mill, the dispersion of the infrared absorbing fine particles proceeds in the dispersion liquid, and simultaneously the atomization due to a collision of the infrared absorbing fine particles or a collision of the media with the fine particles also proceeds, and the infrared absorbing fine particles can be made finer and dispersed (that is, subjected to pulverization and dispersion treatment).

When dispersing the infrared absorbing fine particles according to the present invention in a plasticizer, it is also preferable to add an organic solvent having a boiling point of 120° C. or lower, if desired.

The organic solvent having a boiling point of 120° ° C. or lower includes: specifically toluene, methyl ethyl ketone, methyl isobutyl ketone, butyl acetate, isopropyl alcohol, and ethanol. However, any material can be arbitrarily selected as long as the fine particles exhibiting an infrared absorbing function at a boiling point of 120° C. or lower can be uniformly dispersed.

(C) Removal of Solvent

It is possible to obtain the infrared absorbing fine particle dispersed powder containing powder in which the infrared absorbing fine particles are dispersed in the particles made of solid media such as resin having high chemical resistance and having the average particle size of 1 μm or more, by removing the solvent from the infrared absorbing fine particle dispersion liquid described above.

When removing the solvent, the infrared absorbing fine particle dispersion liquid is preferably dried under decompression as a method for removing the solvent from the infrared absorbing fine particle dispersion liquid. Specifically, the infrared absorbing fine particle dispersion liquid may be dried under decompression with stirring to separate the composition containing infrared absorbing fine particles from the solvent component. A pressure value at the time of reducing the pressure in the drying step is suitably selected.

By using the decompression drying method, solvent removal efficiency from the infrared absorbing fine particle dispersion liquid is improved, and since the infrared absorbing fine particle dispersed powder according to the present invention is not exposed to a high temperature for a long time, the infrared absorbing fine particles dispersed in the dispersed powder do not aggregate, which is preferable. Further, the productivity of the infrared absorbing fine particle dispersed powder is increased, and the evaporated solvent can be easily recovered, which is also preferable from an environmental consideration.

In the infrared absorbing fine particle dispersed powder according to the present invention obtained after the drying step, a residual organic solvent is preferably 5 mass % or less. This is because when the residual organic solvent is 5 mass % or less, no bubbles are generated, and an appearance and the optical properties are kept good at the time of processing the infrared absorbing fine particle dispersed powder into an infrared absorbing ink, an anti-counterfeit ink, or the like.

As equipment used in the drying step, a vacuum fluidized dryer, a vibratory fluidized dryer, a drum dryer and the like are preferable from a viewpoint that heating and decompression are possible, and the mixing and recovery of the dispersed powder are easy, but the equipment is not limited thereto.

For example, in the drying step using the drum dryer, small pieces of the infrared absorbing fine particles dispersed in the solid media are obtained, and by subjecting the small pieces to a mechanical pulverization treatment, the infrared absorbing fine particle dispersed powder according to the present invention can be obtained.

(D) Method for Producing Different Infrared Absorbing Fine Particle Dispersed Powder Further, as a different preferable method for producing the infrared absorbing fine particle dispersed powder according to the present invention, the above-described infrared absorbing fine particle dispersion liquid is kneaded with the above-described predetermined solid medium (resin), to prepare a dispersion body in which the infrared absorbing fine particles according to the present invention are dispersed in the solid medium. Then, the dispersion body may be subjected to mechanical pulverization to obtain an infrared absorbing fine particle dispersed powder according to the present invention.

Further, the infrared absorbing fine particle dispersed powder using a thermosetting resin such as epoxy resin or urethane resin as the solid medium, may be produced as follows: the above described infrared absorbing fine particle dispersion liquid containing the above-described resin is prepared, and the infrared absorbing fine particle dispersion liquid is sprayed in a decompression heated atmosphere. By the spray, the preparation of the infrared absorbing fine particles, the removal of the solvent, and the curing of the resin are simultaneously performed, and the infrared absorbing fine particle dispersed powder using the thermosetting resin as a solid medium can be obtained.

(4) Use Method and Application of Infrared Absorbing Fine Particle Dispersed Powder The infrared absorbing fine particle dispersed powder according to the present invention can be used for an infrared absorbing ink, an anti-counterfeit ink, and the like described below. In addition, since the infrared absorbing fine particles according to the present invention are coated with a resin, water and the like hardly penetrate into the infrared absorbing fine particle dispersed powder, and water does not lead to alkalis or acids, even if it is exposed to the outdoors by being applied to windows, building materials such as outer walls of buildings, and materials of agriculture, forestry and fisheries. Therefore, the infrared absorbing fine particles are not dissolved, and chemical resistance and optical properties can be ensured.

As a result, the infrared absorbing particles contained in the infrared fine particle dispersed powder according to the present invention absorb infrared rays and convert the absorbed infrared rays to heat. The infrared absorbing particles that have absorbed the infrared rays warm the surroundings with the converted heat. Further, since the infrared absorbing particles absorb the infrared rays, the infrared rays can be shielded as a result.

As described above, the infrared absorbing fine particle dispersed powder according to the present invention has excellent chemical resistance, and can withstand a chemical solution such as an alkali or an acid, and also an environment resistant to acid rain or the like. Therefore, by applying or kneading the infrared absorbing fine particle dispersed powder according to the present invention to fibers such as clothing, building materials such as outdoor windows and exterior walls of buildings, and materials for agriculture, forestry and fisheries, the infrared absorbing fine particle dispersed powder can be applied to infrared shielding by infrared absorption or photothermal conversion by infrared absorption.

[2] Dispersion Liquid Containing Infrared Absorbing Fine Particle Dispersed Powder (Dispersed Powder-Containing Dispersion Liquid), and Ink Containing Infrared Absorbing Fine Particle Dispersed Powder When the infrared absorbing fine particle dispersed powder according to the present invention is used by applying it to a desired base material such as the above-described building materials, materials for agriculture, forestry and fisheries, and materials to be printed, it is convenient to use it as a dispersion liquid containing a dispersed powder or an infrared absorbing ink. Therefore, explanation will be given in an order of (1) Dispersion liquid containing infrared absorbing fine particle dispersed powder (dispersion liquid-containing dispersed powder) (2) Ink containing infrared absorbing fine particle dispersed powder (infrared absorbing ink).

(1) Dispersion Liquid Containing Infrared Absorbing Fine Particle Dispersed Powder (Dispersed Powder-Containing Dispersion Liquid)

The dispersed powder-containing dispersion liquid according to the present invention contains the near infrared absorbing fine particle dispersed powder according to the present invention and a solvent that does not dissolve the near infrared absorbing fine particle dispersed powder.

The solvent used for the dispersed powder-containing dispersion liquid is not particularly limited, and may be appropriately selected according to not dissolving the infrared absorbing fine particle dispersed powder, and coating conditions and a coating environment of the dispersed powder-containing dispersion liquid, and appropriately added inorganic binder and resin binder. For example, the liquid solvent is water, an organic solvent, an oil or fat, a liquid resin, a liquid plasticizer for a resin, a polymer monomer, or a mixture thereof.

The dispersed powder-containing dispersion liquid according to the present invention will be described in an order of (A) Solvent, (B) Dispersant, (C) Binder, other additives, and (D) Dispersion method.

(A) Solvent

As the solvent used in the dispersed powder-containing dispersion liquid according to the present invention, organic solvents, oils and fats, liquid plasticizers for medium resins, ester compounds synthesized from polyhydric alcohols and fatty acids, high molecular monomers, and the like can be used. These liquid solvents can be used alone or in combination of two or more. Further, pH may be adjusted by adding an acid or an alkali to these liquid solvents, if necessary.

As the organic solvent, various solvents such as alcohols, ketones, hydrocarbons, glycols, and water can be selected. Specifically, alcoholic solvents such as methanol, ethanol, 1-propanol, isopropanol, butanol, pentanol, benzyl alcohol, diacetone alcohol; ketone solvents such as acetone, methyl ethyl ketone, methyl propyl ketone, methyl isobutyl ketone, cyclohexanone, isophorone; ester solvents such as 3-methyl-methoxy-propionate; glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate; amides such as formamide, N-methylformamide, dimethylformamide, dimethylacetamide, N-methyl-2-pyrrolidone; aromatic hydrocarbons such as toluene and xylene; ethylene chloride, chlorobenzene, etc., can be used.

As the fats and oils, vegetable fats and oils derived from plants are preferable. As the vegetable oils, drying oils such as linseed oil, sunflower oil, and tung oil, semidrying oils such as sesame oil, cottonseed oil, rapeseed oil, soybean oil, rice bran oil, and the like, non-drying oils such as olive oil, coconut oil, palm oil, dehydrated castor oil, can be used. As the vegetable oil-derived compound, fatty acid monoesters and ethers obtained by direct esterification reaction of fatty acid of vegetable oil and monoalcohol are used. Further, commercially available petroleum solvents can be used as fats and oils, and Isopar E, Exxol Hexane, Exol Heptane, Exol E, Exol D30, Exol D40, Exol D60, Exol D80, Exol D95, Exol D110, Exol D130 (all of them are manufactured by Exon Mobil Corporation), and the like can be used as examples.

As the liquid plasticizer for the medium resin, a known liquid plasticizer represented by an organic acid ester type, a phosphate ester type, or the like can be used.

For example, the liquid plasticizer for the medium resin includes: plasticizers which are compounds of monohydric alcohol and organic acid ester, ester-based plasticizers such as polyhydric alcohol organic acid ester compounds, and phosphoric acid plasticizers such as organic phosphate plasticizers, which are preferably liquid at room temperature. Especially, plasticizers which are ester compounds synthesized from polyhydric alcohol and fatty acid are preferable.

The ester compound synthesized from the polyhydric alcohol and the fatty acid is not particularly limited, and includes for example glycol ester compounds obtained by a reaction between glycols such as triethylene glycol, tetraethylene glycol, and tripropylene glycol, and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid, and also includes ester compounds of tetraethylene glycol and tripropylene glycol with the above-described monobasic organic compounds. Especially, fatty acid esters of triethylene glycol such as triethylene glycol dihexanate, triethylene glycol di-2-ethyl butyrate, triethylene glycol di-octanoate, triethylene glycol di-2-ethyl hexanonate are preferable.

A polymer monomer is a monomer that forms a polymer by polymerization or the like, and a preferable polymer monomer used in the present invention includes methyl methacrylate monomer, acrylate monomer, styrene resin monomer, etc.

(B) Dispersant

In order to further improve the dispersion stability of the infrared absorbing fine particles in the dispersed powder-containing dispersion liquid according to the present invention, and to avoid coarsening of the dispersed particle size due to reaggregation, it is also preferable to add various dispersants, surfactants, coupling agents, and the like. The dispersant, coupling agent and surfactant can be selected according to an application. However, it is preferable that the compound has an amine-containing group, a hydroxyl group, a carboxyl group, or an epoxy group as a functional group. These functional groups are adsorbed on the surface of the infrared absorbing fine particles to prevent aggregation, and have an effect of uniformly dispersing the infrared absorbing fine particles according to the present invention in the infrared shielding layer. A polymer dispersant having any of these functional groups in the molecule is more desirable.

Commercial products of such dispersants include: Solsperse® 9000, 12000, 17000, 20000, 21000, 24000, 26000, 27000, 28000, 32000, 35100, 54000, 250 (manufactured by Japan Lubrizol Corporation), EFKA (registered trademark) 4008, 4009, 4010, 4015, 4046, 4047, 4060, 4080, 7462, 4020, 4050, 4055, 4400, 4401, 4402, 4403, 4300, 4320, 4330, 4340, 6220, 6225, 6700, 6780, 6782, 8503 (manufactured by Efka Addives), addispar (registered trademark) PA111, PB821, PB822, PN411, Famex L-12 (manufactured by Ajinomoto Fine Techno Co., Ltd.), DisperBYK (registered trademark) 101, 102, 106, 108, 111, 116, 130, 140, 142, 145, 161, 162, 163, 164, 166, 167, 168, 170, 171, 174, 180, 182, 192, 193, 2000, 2001, 2020, 2025, 2050, 2070, 2155, 2164, 220S, 300, 306, 320, 322, 325, 330, 340, 350, 377, 378, 380N, 410, 425, 430 (manufactured by Big Chemie Japan), Dispalon (registered trademark) 1751N, 1831, 1850, 1860, 1934, DA-400N, DA-703-50, DA-725, DA-705, DA-7301, DN-900, NS-5210, NVI-8514L (Kusumoto Kasei Co., Ltd.), and Alphon (registered trademark) UC-3000, UF-5022, UG-4010, UG-4035, UG-4070 (manufactured by Toagosei Co., Ltd.).

(C) Binder, Other Additives

The dispersed powder-containing dispersion liquid according to the present invention may appropriately contain one or more selected from resin binders. The type of the resin binder contained in the dispersed powder-containing dispersion liquid is not particularly limited. However, as the resin binder, a thermoplastic resin such as an acrylic resin, a thermosetting resin such as an epoxy resin, or the like can be used.

Further, in order to adjust the color tone of the dispersed powder-containing dispersion liquid, known inorganic pigments such as carbon black and red iron oxide and known organic pigments can be added. Further, a known ultraviolet absorber, a known infrared shielding material of an organic substance, and a phosphorus-based coloring inhibitor may be added.

(D) Dispersion Method

A dispersion method of dispersing the infrared absorbing fine particle dispersed powder and the like described above in the solvent to obtain the dispersed powder-containing dispersion liquid according to the present invention, is not particularly limited, as long as the infrared absorbing fine particle dispersed powder can be uniformly dispersed by this method without aggregation. The dispersion method includes, for example, pulverization/dispersion treatment method using devices such as a bead mill, a ball mill, a sand mill, a paint shaker, an ultrasonic homogenizer, etc. Especially, pulverization and dispersion by a medium stirring mill such as a bead mill, a ball mill, a sand mill, and a paint shaker using a medium such as beads, balls, and Ottawa sand are preferable because the time required for a desired dispersed particle size is short.

However, pulverization and dispersion are moderately performed by a medium stirring mill such as a bead mill, a ball mill, a sand mill, and a paint shaker using a medium (beads, balls, Ottawa sand). As a result, in the dispersed powder-containing dispersion liquid, it is possible to avoid a situation in which the chemical resistant resin is dissolved or the dispersed powder is atomized, and the chemical resistance cannot be ensured.

When dispersing the infrared absorbing fine particle dispersed powder in the plasticizer, it is also preferable to add an organic solvent having a boiling point of 120° C. or lower, if desired.

The organic solvent having the boiling point of 120° C. or lower includes, specifically, toluene, methyl ethyl ketone, methyl isobutyl ketone, butyl acetate, isopropyl alcohol, and ethanol, but can be arbitrarily selected as long as the fine particles exhibiting an infrared absorbing function at a boiling point of 120° C. or lower can be uniformly dispersed.

(2) Ink Containing Infrared Absorbing Fine Particle Dispersed Powder (Infrared Absorbing Ink)

The infrared absorbing ink according to the present invention contains the near infrared absorbing fine particle dispersed powder according to the present invention, and at least one selected from an organic binder or a liquid uncured material that is cured by energy rays.

Here, the organic binder is a resin that dissolves in a solvent that can be used for the above-described dispersed powder-containing dispersion liquid. Further, the liquid uncured resin that is cured by energy rays is an uncured resin of an ultraviolet curable resin, an electron beam curable resin, or a thermosetting resin. When the liquid uncured resin that is cured by energy rays is used, a curing agent or a curing accelerator can be added.

The infrared absorbing ink may contain a solvent that can be added to the dispersed powder-containing dispersion liquid. It is required that the solvent that can be added does not separate from the organic binder or the liquid uncured resin that is cured by energy rays.

In the infrared absorbing ink, known inorganic pigments such as carbon black and red iron oxide and known organic pigments can be added in order to adjust the color tone in the same manner as the dispersed powder-containing dispersion liquid.

The infrared absorbing ink can be produced by the same dispersion method as the above-described dispersed powder-containing dispersion liquid.

By applying or kneading the infrared absorbing ink to fibers such as clothing, building materials such as outdoor windows and exterior walls of buildings, and materials for agriculture, forestry and fisheries, the infrared absorbing ink can be applied to infrared shielding by infrared absorption or photothermal conversion by infrared absorption.

[3] Anti-Counterfeit Ink and Anti-Counterfeit Printed Matter

The anti-counterfeit ink according to the present invention is a mixture of the above-described infrared absorbing fine particle dispersed powder, solvent, desired organic binder, and liquid uncured resin that is cured by energy rays, one or more kinds selected from a polymerization initiator, a pigment, a dye, which are appropriately added, and various desired additives. Further, by printing the anti-counterfeit ink according to the present invention on a desired substrate to be printed, an anti-counterfeit printed matter can be obtained. Further, when the anti-counterfeit ink that is cured by energy rays is desired to be obtained, an organic binder is used, which cures a liquid uncured material by irradiation with energy rays.

Therefore, the anti-counterfeit ink and the anti-counterfeit printed matter will be described in an order of (1) Anti-counterfeit ink and (2) Anti-counterfeit printed matter.

(1) Anti-Counterfeit Ink

The anti-counterfeit ink according to the present invention has low absorption in the visible light region and has absorption in the infrared region, and therefore when the printing surface is irradiated with an infrared laser, it absorbs a specific wavelength. Accordingly, regarding the printed matter in which the anti-counterfeit ink is printed on one or both sides of the substrate to be printed, its authenticity can be judged by irradiating it with a specific wavelength to read its reflection or transmission, and from a difference in reflection or transmission. Further, the anti-counterfeit function is maintained without dissolving the infrared absorbing fine particles because of its excellent chemical resistance, for example even when the printed matter is mixed with a high-temperature alkaline detergent solution in a washing machine.

Further, the anti-counterfeit ink according to the present invention contains the infrared absorbing fine particle dispersed powder according to the present invention, thus having less coloring due to transmittance peak in the visible light region, and at the same time, there is a transmittance bottom (absorption peak) in the infrared region. Therefore, by reading information with an infrared sensor from the printed matter printed with the anti-counterfeit ink composition according to the present invention, the authenticity of the printed matter can be judged using the information.

The anti-counterfeit ink according to the present invention will be described in an order of (A) A component of the anti-counterfeit ink, and (B) A method for producing the anti-counterfeit ink.

(A) A Component of the Anti-Counterfeit Ink

The anti-counterfeit ink can also contain a color pigment that transmits infrared light. By containing such a color pigment, it is possible to obtain colored anti-counterfeit ink and the anti-counterfeit printed matter printed with the anti-counterfeit ink, which have the same color as the color pigment in the visible light region perceived by human eyes, but have characteristic absorption in the infrared region. Note that, since the colored anti-counterfeit ink has little absorption in the visible light region, the color tone of the color pigment is maintained. Further, as the color pigment, a fluorescent material, a pearl pigment, or the like may be added.

Further, for example, the anti-counterfeit ink mixed with a black pigment as a color pigment that transmits infrared rays, is recognized as equivalent black by human eyes compared to black ink containing only black pigment, but it can be seen that the film has a different transmission profile when compared by irradiation with infrared light. Accordingly, by printing ordinary black ink as a dummy, which contains no near infrared absorbing material, it is possible to achieve more complex and advanced anti-counterfeiting of a printed matter using this black anti-counterfeit ink, for example, bar code printed matter.

Further, it is also possible to obtain the anti-counterfeit printed matter by applying or printing colored ink using black pigment or other color pigment that transmits infrared light, on the printed layer of the printed matter with one or both sides of the substrate printed with the anti-counterfeit ink of the present invention. This anti-counterfeit printed matter is recognized by a human eye as being black or otherwise colored, but characters and symbols that can only be read by infrared light are hidden and printed in the same area. Therefore, by irradiating infrared rays, the authenticity of the printed matter can be judged.

As such a color pigment, the black pigment transmitting infrared rays is preferable. Further, specific examples of the black pigment includes: complex oxides such as Cu—Fe—Mn, Cu—Cr, Cu—Cr—Mn, Cu—Cr—Mn—Ni, Cu—Cr—Fe, Co—Cr—Fe, or titanium black, titanium nitride, titanium oxynitride, dark azo pigment, perylene black pigment, aniline black pigment, and carbon black. The dispersed particle size of the black pigment in the anti-counterfeit ink is preferably 800 nm or less, more preferably 200 nm or less, like the infrared absorbing fine particles. The reason is the same as in the case of the infrared absorbing fine particles described above.

Further, by decreasing the dispersed particle size of the black pigment, the color tone becomes deep, which is easily liked in design. Further, when fine printing is required, scattering of light is reduced by decreasing the dispersed particle size of the color pigment, and therefore an outline of a printed pattern becomes clear, which is preferable.

Further, the anti-counterfeit ink of the present invention can be a general formulation as needed, depending on a printing method, such as gravure ink, screen ink, offset ink, melt heat transfer ink, intaglio ink, inkjer ink, flexo ink, etc., and additives such as plasticizers, antioxidants, thickeners and waxes can be contained.

(B) A Method for Producing the Anti-Counterfeit Ink.

The anti-counterfeit ink according to the present invention is produced by dispersing the infrared absorbing fine particle dispersed powder and, if necessary, the color pigment in the solvent.

In this event, in order to maintain the chemical resistance of the infrared absorbing fine particle dispersed powder, the powder is required to be uniformly dispersed in the solvent, without dissolving a highly chemically resistant resin in the dispersed powder, and without atomizing the dispersed powder. Therefore, as described above, a solvent containing at least one selected from water, alcohols such as ethanol, ketones such as methyl ethyl ketone, toluene, xylene, vegetable oils, vegetable oil-derived compounds, and petroleum solvents are preferably used as the solvent.

As the vegetable oils, drying oils such as linseed oil, sunflower oil, and tung oil, semidrying oils such as sesame oil, cottonseed oil, rapeseed oil, soybean oil, rice bran oil, and the like, non-drying oils such as olive oil, coconut oil, palm oil, dehydrated castor oil, can be used.

As the vegetable oil-derived compound, fatty acid monoesters and ethers obtained by direct esterification reaction of fatty acid of vegetable oil and monoalcohol are used.

As the petroleum type solvent, the solvent having a high aniline point so as not to erode a rubber part of the printing equipment is preferable, and Isopar E, Exxol Hexane, Exol Heptane, Exol E, Exol D30, Exol D40, Exol D60, Exol D80, Exol D95, Exol D110, Exol D130 (all of them are manufactured by Exon Mobil Corporation), and the like can be used as examples.

These solvents can be selected according to the purpose of use of the anti-counterfeit ink. Among them, vegetable oils and vegetable oil-derived compounds are preferable. This is because the vegetable oils and the vegetable oil-derived compounds do not erode rubber parts of printing equipment. Further, when using the petroleum solvents instead of the vegetable oils or the vegetable oil-derived compounds, those having a high aniline point that do not erode the rubber parts of the printing equipment are preferable.

A method for dispersing the infrared absorbing fine particles and the color pigment as needed in the solvent is not particularly limited. However, it is preferable to use an ultrasonic wave or a medium stirring mill because the particles can be loosened and atomized to some extent. Of course, the dispersion liquid containing the dispersed powder and the infrared absorbing ink prepared in advance may be processed into the anti-counterfeit ink.

A method for obtaining the anti-counterfeit ink by dispersing the infrared absorbing fine particle dispersed powder in the solvent or the liquid uncured material of resin that is cured by energy rays, is not particularly limited, as long as this is a method for uniformly dispersing the dispersed powder in the solvent without dissolving the chemical resistant resin in the dispersed powder and without atomizing the dispersed powder. Examples of the dispersion method include a pulverization/dispersion treatment method using a device such as a bead mill, a ball mill, a sand mill, a paint shaker, and an ultrasonic homogenizer. However, pulverization and dispersion are performed by a medium stirring mill such as a bead mill, a ball mill, a sand mill, and a paint shaker using media (beads, balls, Ottawa sand). As a result, in the dispersion liquid containing the dispersed powder, it is possible to avoid a situation in which the chemical resistant resin is dissolved or the dispersed powder is atomized, resulting in not ensuring the chemical resistance.

(2) Anti-Counterfeit Printed Matter

The anti-counterfeit printed matter can be obtained by applying or printing the anti-counterfeit ink of the present invention on the surface of the substrate to be printed by an ordinary method. In this case, the anti-counterfeit printed matter is formed by fixing the anti-counterfeit ink of the present invention to the surface of the substrate to be printed with the solvent removed by evaporation or the like, or by curing the liquid uncured material of the resin that is cured by energy rays by irradiating with energy rays and fixing it to the substrate to be printed.

Further, when the anti-counterfeit ink of the present invention does not contain a binder, the printed layer is obtained by applying or printing the anti-counterfeit ink on a substrate to be printed and evaporating the solvent. However, in this case, it is preferable to provide a cover layer made of a transparent resin on the printed layer in order to prevent peeling of the printed layer and falling off of the fine particles.

The content of the infrared absorbing fine particles in the anti-counterfeit printed matter according to the present invention can be changed according to the purpose of use, but usually, 0.05 $g/m^2$ or more is preferable. With the content of 0.05 $g/m^2$ or more, absorption in the infrared region is remarkably exhibited, and the printed matter functions as the anti-counterfeit printed matter. Further, an upper limit of the content is not particularly limited, but when it is 5 $g/m^2$ or less, light in the visible light region is not significantly absorbed, which is preferable from a viewpoint of maintaining transparency. Since all fillers equally act on the light incident on the printing surface, the content of the infrared absorbing fine particles can be evaluated as the content per 1 $m^2$ of the layer to be printed.

As the substrate to be printed with the anti-counterfeit ink composition or the anti-counterfeit ink, the substrate suited for the purpose of use may be used, and a mixture of resin and pulp, a resin film, or the like can be used in addition to paper. Further, it is also acceptable that a surface of a seal is printed with the anti-counterfeit ink of the present invention, and this seal is attached to the substrate to be printed.

The anti-counterfeit printed matter of the present invention thus produced, cannot be duplicated by copying, etc., whose authenticity can be judged mechanically and reliably by irradiating infrared rays and detecting reflection or transmission thereof, regardless of visual judgment. In addition, inorganic ultrafine particles called composite tungsten oxide are used as infrared absorbing ultrafine particles and such ultrafine particles are applied to the substrate to be printed by a printing method. Therefore, the anti-counterfeit printed matter which is excellent in chemical resistance and light resistance can be provided at a low cost. Further, the anti-counterfeit function is maintained without dissolving the infrared absorbing fine particles because of its excellent chemical resistance, for example even when the printed matter is mixed with a high-temperature alkaline detergent solution in a washing machine.

EXAMPLES

The present invention will be specifically described hereafter, with reference to examples. However, the present invention is not limited to the examples described below.

Note that the dispersed particle size of the dispersion liquid in the examples and comparative examples is indicated by average values measured by a particle size measuring device based on a dynamic light scattering method (ELS-8000 manufactured by Otsuka Electronics Co., Ltd.). Further, the average particle size of the dispersed powder in Examples and Comparative Examples was measured as a median value of a volume cumulative particle size, using a Microtrac HIRA manufactured by Microtrac Bell Co., Ltd., which is a particle size distribution measuring apparatus based on a laser diffraction/scattering method.

Further, the optical properties of the printed layer in Examples and Comparative Examples were measured using a spectrophotometer (U-4100 manufactured by Hitachi, Ltd.), and a visible light transmittance and a solar transmittance were calculated according to JISR3106.

Example 1

7.43 kg of cesium carbonate ($Cs_2CO_3$) was dissolved in 6.70 kg of water to obtain a solution. The solution was added to 34.57 kg of tungstic acid ($H_2WO_4$), mixed with sufficient stirring, and then dried with stirring, and thereafter the mixture was dried with stirring (the molar ratio of W to Cs is equivalent to 1:0.33). The dried product was heated while supplying 5 vol % $H_2$ gas using $N_2$ gas as a carrier, and was fired at a temperature of 800° C. for 5.5 hours. Thereafter, the supply gas was switched to only $N_2$ gas, and the temperature was lowered to room temperature to obtain Cs tungsten oxide particles.

20 parts by weight of the Cs tungsten oxide particles, 75 parts by weight of toluene, and 5 parts by weight of a polyacrylate-based polymer resin (hereinafter, referred to as "resin a" in Examples and Comparative Examples) were mixed, to prepare 30 kg of slurry. This slurry was put into a medium stirring mill together with beads, and pulverized and dispersed for 10 hours. Note that a horizontal cylindrical annular type (manufactured by Ashizawa Co., Ltd.) was used as the medium stirring mill, and zirconia was used as a material of an inner wall of a vessel and a rotor (rotary stirring part). Further, beads made of YSZ (Yttria-Stabilized Zirconia: yttria-stabilized zirconia) having a diameter of 0.1 mm were used as the beads. A rotation speed of the rotor was set to 14 rpm/sec, and a flow rate of the slurry was set to 0.5 kg/min to perform pulverization and dispersion treatment to obtain an infrared absorbing fine particle dispersion liquid of Example 1.

The dispersed particle size of the infrared absorbing fine particle dispersion liquid of Example 1 was measured using a particle size measuring device based on a dynamic light scattering method, and it was found to be 70 nm. Note that as a setting of the dispersed particle size measurement, a particle refractive index was 1.81, and a particle shape was set as nonspherical. Further, a background was measured using toluene, and the solvent refractive index was 1.50.

Resin a was further added to the infrared absorbing fine particle dispersion liquid of Example 1, and the weight ratio of the resin a to the infrared absorbing fine particles (Cs tungsten oxide fine particles) [resin a/infrared absorbing fine particles] was adjusted to 4. Toluene was removed from the obtained adjustment liquid using a drum dryer, to generate small pieces of resin in which the infrared absorbing fine particles are dispersed, and mechanical pulverization was added to these small pieces of resin, to obtain an infrared absorbing fine particle dispersed powder of Example 1.

An average particle size of the obtained infrared absorbing fine particle dispersed powder of Example 1 was measured, and it was found to be 5.3 μm.

50 g of the infrared absorbing fine particle dispersed powder of Example 1 and 50 g of an ultraviolet curable resin UV3701 (manufactured by Toagosei Co., Ltd.) were mixed well to obtain an anti-counterfeit ink of Example 1.

A transparent PET film having a thickness of 50 μm was used as a substrate to be printed, and the anti-counterfeit ink of Example 1 was formed on the surface thereof by a bar coater. This film was irradiated with ultraviolet rays using a high-pressure mercury lamp to cure the ultraviolet curable resin, thereby obtaining a printed layer according to the anti-counterfeit ink of Example 1.

The optical properties of the obtained printed layer of Example 1 were measured. Then, it was found that the transmittance of light having a wavelength of 550 nm in the visible light region was 66%, the transmittance of light having a wavelength of 1000 nm was 4%, and the transmittance of light having a wavelength of 1500 nm was 1%.

A mixed solution of 0.3 mass % of a linear alkylbenzenesulfonic acid-based surfactant, 1 mass % of sodium hydroxide, and 98.7 mass % of pure water was kept at a temperature of 70° C.

The printed layer of Example 1 was immersed in the mixed solution for 30 minutes. The optical properties of the printed layer of Example 1 after the immersion were measured. Then, it was found that the transmittance of light having a wavelength of 550 nm in the visible light region was 69%, the transmittance of light having a wavelength of 1000 nm was 5%, the transmittance of light having a wavelength of 1500 nm was 2%, and it was confirmed that the infrared absorption properties were maintained.

Example 2

Tungsten hexachloride was dissolved little by little in ethanol to obtain a solution. This solution was dried at 130° C. to obtain a powdery starting material. This starting material was heated at 550° C. for 1 hour in a reducing atmosphere (argon/hydrogen=95/5 volume ratio). Then, after returning to room temperature once, the starting material was heated for 1 hour in an argon atmosphere at 800° C., to prepare tungsten oxide particles of $W_{18}O_{49}$ ($WO_{2.72}$). In $WO_{2.72}$, the crystal phase of $W_{18}O_{49}$ was observed as a result of identification of the crystal phase by X-ray diffraction.

20 parts by weight of the $WO_{2.72}$ powder, 75 parts by weight of toluene and 5 parts by weight of resin a were mixed, and the same distribution treatment as in Example 1 was performed, to obtain an infrared absorbing fine particle dispersion liquid according to Example 2 having a dispersed particle size of 70 nm.

An infrared absorbing fine particle dispersed powder, an anti-counterfeit ink and an anti-counterfeit printed layer of Example 2 were obtained, in the same manner as in Example 1 except that an infrared absorbing fine particle dispersion system of Example 2 was used instead of the infrared absorbing fine particle dispersion liquid of Example 1.

An average particle size of the infrared absorbing fine particle dispersed powder of Example 2 was 4.7 µm. The same evaluation as in Example 1 was performed on the infrared absorbing fine particle dispersion liquid, the infrared absorbing fine particle dispersed powder, and the anti-counterfeit printed layer of Example 2. The production conditions and evaluation results are shown in Tables 1 and 2.

Example 3

Boron carbide ($B_4C$) was used as a boron source and a reducing agent, and lanthanum oxide was used as a lanthanum source. These were weighed and mixed such that a value of B/La, which is an element ratio of lanthanum to boron, was 5.90. Then, a mixture was fired at 1600±50° C. for 6 hours in an argon atmosphere to obtain a powder containing lanthanum hexaboride particles.

Next, 10 parts by weight of the prepared lanthanum hexaboride particle-containing powder, 80 parts by weight of toluene, and 10 parts by weight of resin a were weighed and mixed, and the same dispersion treatment as in Example 1 was performed to obtain an infrared absorbing fine particle dispersion liquid according to Example 3 having a dispersed particle size of 80 nm.

Resin a was further added to the infrared absorbing fine particle dispersion liquid of Example 3, and a mixture was adjusted so that a weight ratio of resin a to infrared absorbing fine particles (lanthanum hexaboride fine particles) [resin a/infrared absorbing fine particles] is 7. Otherwise by performing the same operation as in Example 1, an infrared absorbing fine particle dispersed powder, an anti-counterfeit ink and an anti-counterfeit printed layer according to Example 3 were obtained.

An average particle size of the infrared absorbing fine particle dispersed powder of Example 3 was 6.5 µm. The same evaluation as in Example 1 was performed on the infrared absorbing fine particle dispersion liquid, the infrared absorbing fine particle dispersed powder, and the anti-counterfeit printed layer of Example 3. The production conditions and evaluation results are shown in Tables 1 and 2.

Comparative Example 1

The resin a was further added to the infrared absorbing fine particle dispersion liquid of Example 1, and the weight ratio of the resin a to the infrared absorbing fine particles (Cs tungsten oxide fine particles) was adjusted to be 4 (resin a/infrared absorbing fine particles). Toluene was removed from the obtained adjustment liquid while performing crushing treatment using a vacuum crusher (manufactured by Ishikawa Plant), to obtain infrared absorbing fine particle dispersed powder according to Comparative Example 1.

An average particle size of the obtained infrared absorbing fine particle dispersed powder according to Comparative Example 1 was measured, and it was found to be 0.7 µm.

50 g of the infrared absorbing fine particle dispersed powder of Comparative Example 1 was mixed well with 50 g of an ultraviolet curable resin UV3701 (manufactured by Toagosei Co., Ltd.) to obtain an anti-counterfeit ink according to Comparative Example 1.

A 50 µm-thick transparent PET film was used as a substrate to be printed, and the surface thereof was coated with the anti-counterfeit ink of Comparative Example 1 using a bar coater. The layer thus obtained was irradiated with ultraviolet rays using a high-pressure mercury lamp, and the ultraviolet curable resin is cured, to obtain the printed layer of the anti-counterfeit ink according to Comparative Example 1.

Optical properties of the obtained printed layer of Comparative Example 1 were measured, and it was found that the transmittance of light having a wavelength of 550 nm in the visible light region was 71%, the transmittance of light having a wavelength of 1000 nm was 4%, and the transmittance of light having a wavelength of 1500 nm was 1%.

A mixed solution of 1 part by weight of a neutral detergent, 1 part by weight of sodium hydroxide and 98 parts by weight of pure water was maintained at a temperature of 70° C.

The printed layer of Comparative Example 1 was immersed in the mixed solution for 30 minutes. The optical properties of the printed layer of Comparative Example 1 after immersion were measured. Then, it was found that the transmittance of light having a wavelength of 550 nm in the visible light region was 88%, the transmittance of light having a wavelength of 1000 nm was 89%, and the transmittance of light having a wavelength of 1500 nm was 88%, and the infrared absorption properties have disappeared The production conditions and evaluation results are shown in Tables 1 and 2.

Comparative Example 2

Resin a was further added to the infrared absorbing fine particle dispersion liquid of Example 3, and the weight ratio of the resin a to the infrared absorbing fine particles (Cs tungsten oxide fine particles) was adjusted to be 7 (resin a/infrared absorbing fine particles). Toluene was removed from the obtained adjustment liquid while performing crushing treatment using a vacuum pulverizer (manufactured by Ishikawa Plant), to obtain infrared absorbing fine particle dispersed powder according to Comparative Example 1.

An average particle size of the obtained infrared absorbing fine particle dispersed powder according to Comparative Example 2 was measured, and it was found to be 0.7 µm.

An anti-counterfeit ink and an anti-counterfeit printed layer according to Comparative Example 2 were obtained, by performing the same operation as in Example 1, except that the infrared absorbing fine particle dispersed powder of Comparative Example 2 was used instead of the infrared absorbing fine particle dispersed powder of Comparative Example 1.

The same evaluation as in Comparative Example 1 was performed on the anti-counterfeit printed layer of Comparative Example 2. The production conditions and evaluation results are shown in Tables 1 and 2.

TABLE 1

|  | Infrared absorbing material | Resin | Equipment used for removing solvent |
|---|---|---|---|
| Example 1 | Cs tungsten oxide | Polyacrylate-based polymer resin | Drum dryer |
| Example 2 | Tungsten oxide | Polyacrylate-based polymer resin | Drum dryer |
| Example 3 | Lanthanum hexaboride | Polyacrylate-based polymer resin | Drum dryer |
| Comparative example 1 | Cs tungsten oxide | Polyacrylate-based polymer resin | Vacuum pulverizer |
| Comparative example 2 | Lanthanum hexaboride | Polyacrylate-based polymer resin | Vacuum pulverizer |

TABLE 2

|  | Dispersed particle size in infrared absorbing fine particle dispersion liquid [nm] | Dispersed particle size in infrared absorbing fine particle dispersion liquid [μm] | Anti-counterfeit printed layer | | | | | |
|---|---|---|---|---|---|---|---|---|
|  |  |  | Before immersion | | | After immersion | | |
|  |  |  | Wavelength 550 nm [%] | Wavelength 1000 nm [%] | Wavelength 1500 nm [%] | Wavelength 500 nm [%] | Wavelength 1000 nm [%] | Wavelength 1500 nm [%] |
| Example 1 | 70 | 5.3 | 66 | 4 | 1 | 69 | 5 | 2 |
| Example 2 | 70 | 4.7 | 65 | 4 | 10 | 73 | 5 | 12 |
| Example 3 | 80 | 6.5 | 65 | 20 | 71 | 67 | 21 | 74 |
| Comparative example 1 | 70 | 0.7 | 71 | 4 | 1 | 88 | 89 | 88 |
| Comparative example 2 | 80 | 0.7 | 71 | 19 | 72 | 88 | 88 | 89 |

The invention claimed is:

1. An infrared absorbing fine particle dispersed powder made of solid media with infrared absorbing fine particles dispersed inside, wherein
the infrared absorbing fine particle dispersed powder has an average particle size of 1 μm or more,
the infrared absorbing fine particles have a dispersed particle size of 1 nm or more and 800 nm or less,
the solid medium is a resin selected from a resin group consisting of polyethylene resin, polypropylene resin, acrylic resin, polystyrene resin, polyisobutylene resin, epoxy resin, polyimide resin, ionomer resin, fluorine resin, urethane resin, ABS resin, polyvinyl alcohol resin, polyvinyl acetate resin, vinyl chloride resin, and vinylidene chloride resin, or a mixture of two or more resins selected from the resin group, or a copolymer of two or more resins selected from the resin group, and
a weight ratio of the resin to the infrared absorbing fine particles (the resin/the infrared absorbing fine particles) is 4 to 7.

2. The infrared absorbing fine particle dispersed powder according to claim 1, wherein the infrared absorbing fine particles are represented by a general formula $M_xW_yO_z$ (wherein M element is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb; W is tungsten; O is oxygen; and the general formula $M_xW_yO_z$ satisfying $0.20 \leq x/y \leq 0.37$, and $2.2 \leq z/y \leq 3.0$).

3. The infrared absorbing fine particle dispersed powder according to claim 1, wherein the infrared absorbing fine particles include a hexagonal crystal structure.

4. The infrared absorbing fine particle dispersed powder according to claim 1, wherein the infrared absorbing fine particles are represented by a general formula $W_yO_z$ (wherein W is tungsten; O is oxygen; and the general formula $W_yO_z$ satisfying $2.2 \leq z/y \leq 2.999$).

5. The infrared absorbing fine particle dispersed powder according to claim 1, wherein the infrared absorbing fine particles are represented by a general formula $XB_m$ (wherein X is at least one metal element selected from the group consisting of Y, La, Ce, Pr, Nd, Sm, Eu, Gd, Tb, Dy, Ho, Er, Tm, Yb, Lu, Sr, and Ca; and B is boron; m is a number indicating an amount of boron in the general formula; and the general formula $XB_m$ satisfying $3 \leq m \leq 20$).

6. The infrared absorbing fine particle dispersed powder according to claim 1, wherein the solid medium is a resin selected from a resin group consisting of polyethylene resin, polypropylene resin, acrylic resin, polystyrene resin, polyisobutylene resin, and fluorine resin, or a mixture of two or more resins selected from the resin group, or a copolymer of two or more resins selected from the resin group.

7. A dispersion liquid containing the infrared absorbing fine particle dispersion powder of claim 1, and a solvent.

8. An ink containing the infrared absorbing fine particle dispersed powder of claim 1, and at least one selected from an organic matter or a liquid uncured material of resin curable by energy rays.

9. An anti-counterfeit ink, containing the infrared absorbing fine particle dispersed powder of claim 1, and at least one selected from an organic matter or a liquid uncured material of resin curable by energy rays.

10. The anti-counterfeit ink according to claim 9, further containing a solvent, wherein the solvent is at least one selected from the group consisting of water, organic solvents, vegetable oils, vegetable oil-derived compounds, and petroleum solvents.

11. An anti-counterfeit printed matter, containing the infrared absorbing fine particle dispersed powder of claim 1.

12. A method for producing the infrared absorbing fine particle dispersed powder of claim 1, comprising:
mixing infrared absorbing fine particles, a surfactant and/or a coupling agent having at least one functional group selected from an amine-containing group, a hydroxyl group, a carboxyl group, or an epoxy group, and a solvent dissolving at least one resin selected from polyethylene resin, polypropylene resin, acrylic resin, polystyrene resin, polyisobutylene resin, epoxy resin, polyimide resin, ionomer resin, fluorine resin, urethane resin, ABS resin, polyvinyl alcohol resin, polyvinyl acetate resin, vinyl chloride resin, and vinylidene chloride resin, to obtain an infrared absorbing fine particle dispersion liquid having a dispersed particle size of the infrared absorbing fine particles of 1 nm or more and 800 nm or less, and removing the solvent from the infrared absorbing fine particle dispersion liquid to obtain the infrared absorbing fine particle dispersed powder.

\* \* \* \* \*